June 25, 1963 S. E. MARTIN 3,094,843
AUTOMATIC EMERGENCY POWER FOR VACUUM POWERED BRAKING SYSTEMS
Filed March 18, 1960 2 Sheets-Sheet 2

INVENTOR.
STEVE E. MARTIN
BY
William P. Hickey
ATTORNEY

United States Patent Office 3,094,843
Patented June 25, 1963

3,094,843
AUTOMATIC EMERGENCY POWER FOR VACUUM POWERED BRAKING SYSTEMS
Steve E. Martin, Pine Bluff Arsenal, Ark., assignor to The Bendix Corporation, a corporation of Delaware
Filed Mar. 18, 1960, Ser. No. 16,059
2 Claims. (Cl. 60—54.5)

The present invention relates as indicated to vacuum powered braking systems; and more particularly to means for power actuating such systems during vacuum failure.

In large size trucks and heavy off the road vehicles equipped with vacuum power braking systems, it has been almost an impossibility in some instances to apply the brakes manually during vacuum failure with sufficient force to adequately stop the vehicle. In the passenger car field, practically all of which use vacuum powered braking units, the recent trend has been toward shorter foot pedal movements so that it has now become increasingly difficult even in passenger cars to produce an adequate braking of the vehicle manually during vacuum failure.

The principal object of the present invention is the provision of a new and improved vacuum powered braking system which can be power actuated during vacuum failure.

The invention resides in certain constructions and combinations and arrangements of parts; and further objects and advantages of the invention will become apparent to those skilled in the art to which the invention relates from the following description of the preferred embodiment described with reference to the accompanying drawings forming a part of the specification, and in which.

Figure 1:
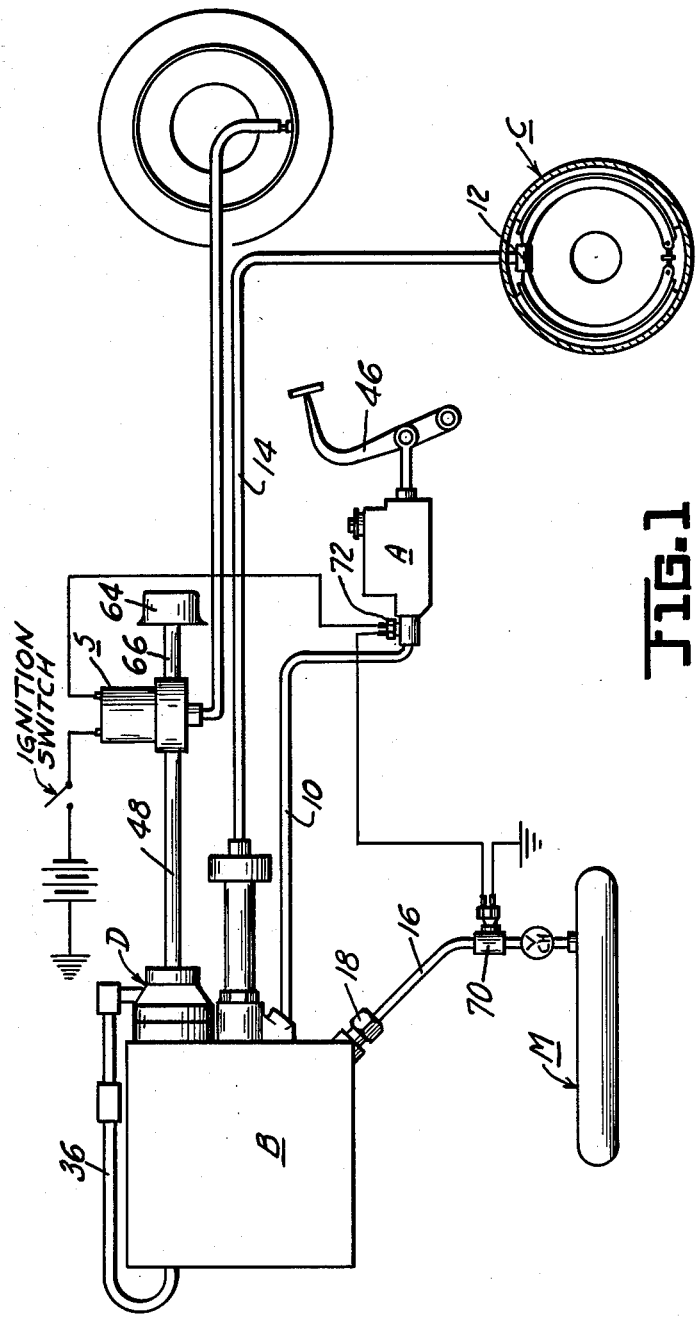
FIGURE 1 is a schematic view of an automotive braking system embodying principles of the present invention.

The automotive hydraulic braking system shown in the drawing generally comprises a master cylinder A whose discharge pressure is communicated by line 10 to the hydraulic fluid pressure intensifying unit B. The pressure intensifying unit B is in turn communicated to the wheel cylinders 12 of the brake assemblies C (only one of which is shown) by means of conduit 14. The fluid pressure intensifying unit B is of the type actuated by vacuum normally supplied from the manifold M of the vehicle's propelling engine through the vacuum line 16 and check valve 18.

Figure 2:
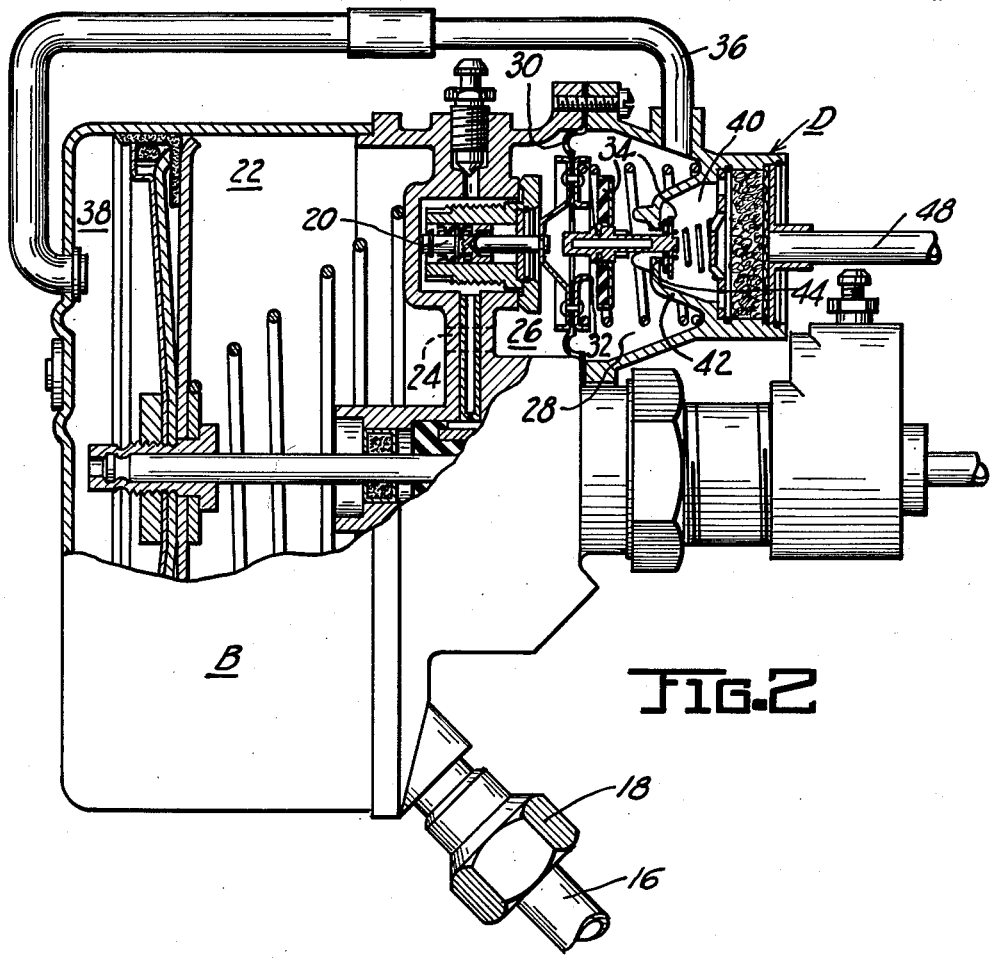
FIGURE 2 is a side elevational view of the pneumatically actuated fluid pressure intensifying unit shown in FIGURE 1, but with portions broken away to show its internal mechanism.

The pressure signal of the master cylinder A is conducted from the line 10 through internal passages in the unit B to the back side of a hydraulic piston 20 which in turn actuates the control valve D of the servomotor unit. As best seen in FIGURE 2 of the drawings, vacuum from the line 16 is continually communicated to the front powered chamber 22 of the unit's servomotor, and thence through passageway 24 to the vacuum chamber 26 of the control valve D. Vacuum chamber 26 is separated from the control chamber 28 of the valve structure D by means of a flexible diaphragm 30 which carries an annular vacuum valve seat 32 at its center for sealing engagement with the valve's spool-shaped poppet 34. The valve D is shown in FIGURE 2 in its normal released condition wherein vacuum is communicated past the valve seat 32 to the control chamber 28, and thence through the conduit 36 to the rear opposing power chamber 38 of the servo motor. The control chamber 28 is in turn separated from the atmospheric valve chamber 40 of the valve by means of a rigid partition 42 whose center forms the atmospheric valve seat 44 and which is normally engaged by the other flange of the poppet member 34. When it is desired to apply the vehicle's brakes, actuation of the foot pedal lever 46 causes hydraulic pressure to be exerted against the piston 20; whereupon the vacuum valve seat 32 abuts the poppet member 34 to close off further vacuum communication to the rear opposing power chamber 38, and thereafter lifts the front flange of the poppet member 34 off of the atmospheric seat 44 to admit atmospheric pressure to the power chamber 38. This of course actuates the hydraulic piston of the unit B (not shown) which in turn forces hydraulic fluid out through the line 14 and under a pressure greater than that in line 10 to produce a brake actuation of the vehicle. This system so far described is generally that shown and described in the Pfeifer Patent No. 2,867,090; and for a more complete understanding of its construction and operation, reference may be had to that patent.

According to principles of the present invention, a source of super atmospheric pressure is communicated to the atmospheric valve chamber 40 in such manner that, during vacuum failure, the super atmospheric pressure is communicated to the chamber 40 in place of atmospheric pressure; so that the identical structure will now supply a super atmospheric pressure to the chamber 38 when atmospheric pressure exists in the opposing power chamber 22.

Figure 3:
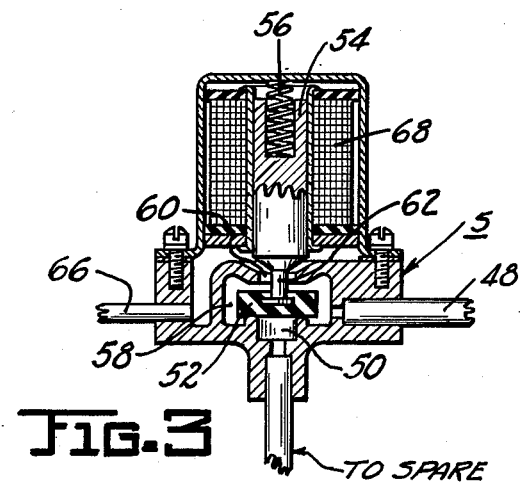
FIGURE 3 is a cross sectional view of the solenoid valve shown in FIGURE 1.

In the preferred embodiment shown in the drawing, a three-way normally spring biased closed solenoid valve is connected to the atmospheric valve chamber 40 by means of a conduit 48. As best seen in FIGURE 3, the valve is provided with a super atmospheric port 50 which is normally closed off by a poppet 52. The poppet 52 is actuated by an armature 54 which is normally biased in a direction closing the port 50 by means of the coil spring 56. The poppet 52 is positioned in the valve's control chamber 58, which is in continual communication with its discharge line 48; and an atmospheric valve port 60 is provided opposite the super atmospheric port 50 with the stem portion 62 of the armature 54 projecting therethrough in such manner that upward movement of the poppet 52 closes off the atmospheric port 60. In the normal condition of the valve, atmospheric pressure from an air cleaner 64 flows through supply line 66 and the normally open atmospheric port 60 to its discharge line 48 to permit the fluid pressure intensify unit B to be normally actuated by means of vacuum to atmospheric pressure differential. When the field winding 68 of the solenoid valve S is energized, the armature 54 is snapped upwardly to cause the poppet 52 to open the super atmospheric port 50 and close the atmospheric port 60, and thereafter communicate super atmospheric pressure to the atmospheric valve chamber 40 of the control valve D.

In the preferred embodiment shown in the drawing, the vehicle's spare tire is used as a source of super atmospheric pressure and the solenoid valve S is controlled in such a way as to valve off the spare tire until such time as the manifold vacuum has failed and the brakes of the vehicle are actuated. The connection which is made to the spare tire is preferably one which, when coupled to the valve stem of the spare tire, opens the tire valve and holds it open until the connection is removed.

It will be understood that the vacuum in the manifold M of the vehicle's propelling engine fluctuates from time to time depending upon the throttle setting and other factors; and it is desired that automatic means are provided for automatically communicating pressure from the spare tire to the valve D automatically whenever insufficient vacuum exists in the manifold M to adequately brake the vehicle. Inasmuch as the vacuum in the manifold M will drop below a safe level on numerous occasions when it is not necessary to brake the vehicle, it will be desirable to provide further means which prevents the spare tire from being communicated to the control valve D except during those times when an actual brake application is to be made. This desired control function is accomplished in the embodiment shown in the drawing by electrically connecting a normally open vacuum switch 70 in the vacuum line 16 in series circuit with the normally open stop light switch 72 and the fuel winding 68 of the solenoid valve S. By means of this arrangement the solenoid valve S never becomes actuated unless both the vacuum supplied to the control valve D falls below a predetermined level, and a brake application is made. At this time, hydraulic pressure will have been supplied to the piston 20 to close off the vacuum valve seat 32 of the control valve D and to open its atmospheric valve 44. Inasmuch as the stop light switches 72 are made to close at about the same hydraulic pressure required to actuate the control valve D, the super atmospheric pressure from the spare tire will reach the atmospheric valve chamber 40 at about the same time that the poppet 34 is raised off the atmospheric valve seat 44; and the super atmospheric pressure will thereafter be communicated to the rear power chamber 38 to provide an emergency application of the vehicle's brakes. Inasmuch as the control valve D is used in the normal way, the operator of the vehicle is not taken by surprise, and he can actuate the brake pedal lever 46 in the normal way to modulate the emergency brake application which is provided.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In an automotive vehicle having pneumatic load bearing tires and a pressure filled spare tire, a vacuum powered braking system including an emergency braking system operative in the event of inadequate vacuum supply, which vacuum powered braking system comprises:

a source of vacuum;
   a master cylinder;
   a fluid pressure motor having a movable wall therein which is normally actuated when atmospheric pressure is communicated to one side of said movable wall and said vacuum source is communicated to the opposite side of said movable wall;
   a control valve operatively connected to said master cylinder, said control valve having a control port and an atmospheric port;
   a conduit connecting a pressure source within the spare tire to the atmospheric port of said control valve;
   a means sensing the amount of vacuum of said vacuum source;
   a controllable valve blocking communication of the pressure in the spare tire with said atmospheric port; and
   a means controlled by said master cylinder and operatively connecting said vacuum sensing means to said controllable valve upon actuation of said master cylinder whereupon the vacuum sensing means can actuate said controllable valve to open communication of said spare tire pressure to the atmospheric port of said control valve.

2. In an automotive vehicle having pneumatic load bearing tires and a normally non-used inflated spare tire: a vacuum powered hydraulic braking system of the type having a hydraulic brake applying fluid pressure motor, a normally open hydraulic switch which is closed when a primary hydraulic pressure modulating device supplying pressure to said system builds up hydraulic pressure above a predetermined level; a source of vacuum; a pneumatically actuated fluid pressure motor for actuating said brake applying fluid pressure motor and having an internal chamber divided into opposing chambers by a movable wall, said source of vacuum being continually communicated to one of said opposing chambers; a control valve actuated by said primary hydraulic pressure modulating device and having a vacuum inlet port connected to said source of vacuum, a control port connected to the other of said opposing chambers, and an atmospheric port; a two position valve which when in a first position communicates atmospheric pressure to said atmospheric port and when in a second position communicates said super atmospheric pressure of said space tire to said atmospheric port, a spring normally biasing said valve to its first position, a solenoid which when energized moves said valve to its second position, and a normally open vacuum switch which closes when the pressure in said vacuum port approaches beyond a predetermined level to atmospheric pressure, said solenoid, hydraulic and vacuum switches being connected in electrical series circuit so that pressure from said spare tire is only used to actuate said pneumatic fluid pressure motor when the vacuum approaches atmospheric pressure and said primary fluid pressure modulating device is actuated to operate said control valve.

References Cited in the file of this patent

UNITED STATES PATENTS

| | | |
|---|---|---|
| 2,057,707 | Carroll | Oct. 20, 1936 |
| 2,345,213 | O'Shei | Mar. 28, 1944 |
| 2,532,462 | Rockwell | Dec. 5, 1950 |
| 2,577,874 | Carnahan | Dec. 11, 1951 |
| 2,631,433 | Thomas | Mar. 17, 1953 |
| 2,960,100 | Price et al. | Nov. 15, 1960 |